US011739633B2

United States Patent
Segura et al.

(10) Patent No.: US 11,739,633 B2
(45) Date of Patent: *Aug. 29, 2023

(54) MUD PULSE VALVE

(71) Applicant: Bench Tree Group, LLC, Georgetown, TX (US)

(72) Inventors: Pedro R. Segura, Round Rock, TX (US); John R. Menconi, Phoenix, AZ (US)

(73) Assignee: Bench Tree Group, LLC, Georgetown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,676

(22) Filed: Dec. 7, 2022

(65) Prior Publication Data

US 2023/0100563 A1 Mar. 30, 2023

Related U.S. Application Data

(63) Continuation of application No. 17/407,908, filed on Aug. 20, 2021, now Pat. No. 11,525,355, which is a continuation of application No. 16/925,584, filed on Jul. 10, 2020, now Pat. No. 11,098,580.

(60) Provisional application No. 62/872,300, filed on Jul. 10, 2019.

(51) Int. Cl.
    *H04N 5/44* (2011.01)
    *E21B 47/18* (2012.01)
    *E21B 34/06* (2006.01)

(52) U.S. Cl.
    CPC ............ *E21B 47/18* (2013.01); *E21B 34/066* (2013.01)

(58) Field of Classification Search
    CPC .......... E21B 47/16; E21B 47/14; E21B 47/18; E21B 47/12; E21B 47/011; E21B 47/122; G01V 11/002; G01V 1/40; G01V 1/50; G01V 1/44; G01V 1/46
    See application file for complete search history.

(56) References Cited

U.S. PATENT DOCUMENTS

| | | | |
|---|---|---|---|
| 3,958,217 A * | 5/1976 | Spinnler | E21B 47/18 367/83 |
| 4,742,498 A * | 5/1988 | Barron | E21B 47/24 367/83 |
| 5,040,155 A | 8/1991 | Feld | |
| 5,586,084 A | 12/1996 | Barron et al. | |
| 6,016,288 A * | 1/2000 | Frith | E21B 47/24 181/102 |

(Continued)

*Primary Examiner* — Munear T Akki
(74) *Attorney, Agent, or Firm* — Dunlap Codding, P.C.

(57) ABSTRACT

A mud pulse telemetry valve and method including a flow tube having at least one upper hydraulic opening extending from an inner surface and at least one lower hydraulic opening extending from an inner surface, a flow restriction member positioned in the flow tube and defining an orifice, an orifice housing connected to the flow tube and supporting the flow restriction member, and a screen defining a flow path from a first end of the screen to the orifice. The orifice housing has at least one inlet port in fluid communication with the upper hydraulic opening upstream of the flow restriction member, and the screen has a plurality of filter openings positioned between the flow path and the at least one inlet port. The mud pulse telemetry valve further has a control valve assembly and a pilot valve assembly.

11 Claims, 8 Drawing Sheets

(56) References Cited

U.S. PATENT DOCUMENTS

| | | | | |
|---|---|---|---|---|
| 6,469,637 | B1 * | 10/2002 | Seyler | ............... E21B 47/24 |
| | | | | 340/854.3 |
| 6,484,817 | B2 | 11/2002 | Innes | |
| 2004/0202047 | A1 * | 10/2004 | Fripp | ............... B06B 1/06 |
| | | | | 340/854.8 |
| 2007/0104030 | A1 | 5/2007 | Kusko et al. | |
| 2018/0347350 | A1 * | 12/2018 | Frith | ............... E21B 47/24 |

* cited by examiner

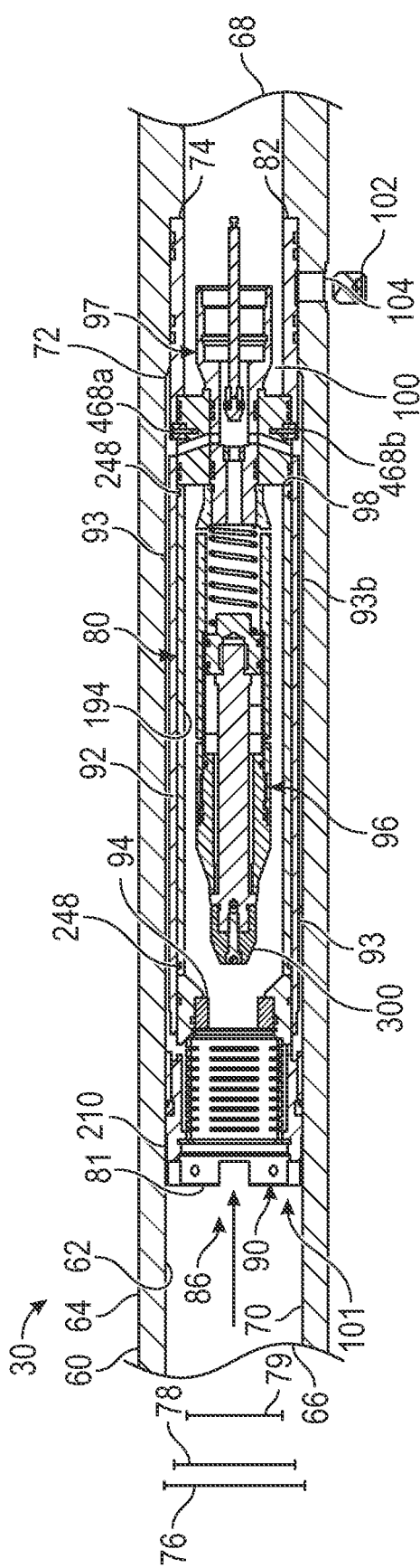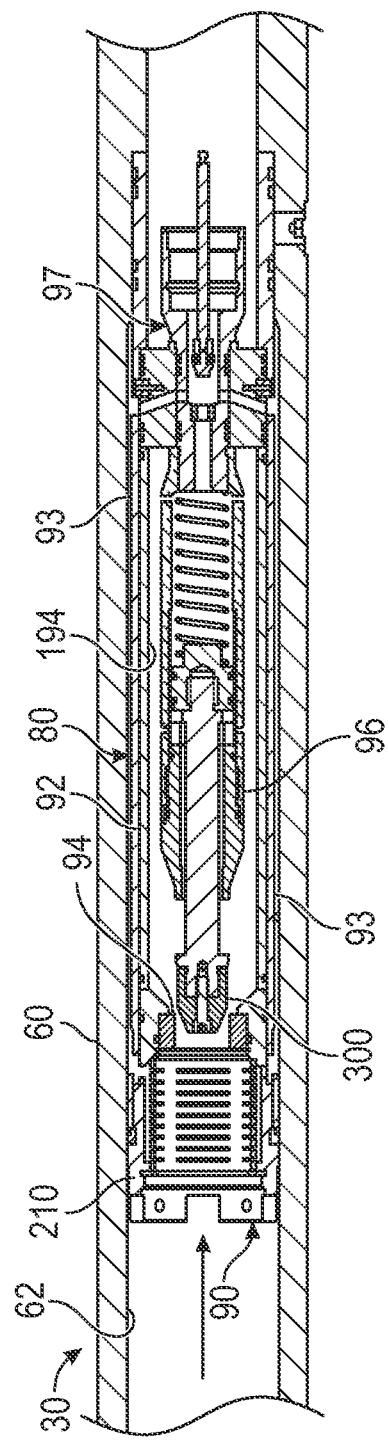
FIG. 3
FIG. 4

MUD PULSE VALVE

INCORPORATION BY REFERENCE

The present patent application is a continuation of U.S. Ser. No. 17/407,908, filed on Aug. 20, 2021, which is a continuation of U.S. Ser. No. 16/925,584, filed on Jul. 10, 2020, now U.S. Pat. No. 11,098,580, which claims priority to U.S. provisional patent application U.S. Ser. No. 62/872, 300, filed on Jul. 10, 2019; the entire contents of each being hereby expressly incorporated herein by reference.

BACKGROUND

Modern petroleum drilling and production operations demand a great quantity of information relating to parameters and conditions downhole. Such information typically includes characteristics of the earth formations traversed by the wellbore, besides data relating to the size and configuration of the borehole itself. The collection of information relating to conditions downhole, which commonly is called "logging," can be performed by several methods. Oil well logging has been known in the industry for many years as a technique for providing information to a driller regarding the particular earth formation being drilled. In conventional oil well wireline logging, a probe or "sonde" housing formation sensors is lowered into the borehole after some or all of the well has been drilled, and is used to determine certain characteristics of the formations traversed by the borehole. The sonde is supported by a conductive wireline, which attaches to the sonde at the upper end. Power is transmitted to the sensors and instrumentation in the sonde through the conductive wireline. The instrumentation in the sonde communicates information to the surface by electrical signals transmitted through the wireline.

The problem with obtaining downhole measurements via wireline is the drilling assembly must be removed or "tripped" from the drilled borehole before the desired borehole information can be obtained. This can be both time-consuming and costly, especially where a substantial portion of the well has been drilled. In this situation, thousands of feet of tubing must be removed and stacked on the platform (if offshore). Typically, drilling rigs are rented by the day at a substantial cost. The cost of drilling a well is directly proportional to the time required to complete the drilling process. Removing thousands of feet of tubing to insert a wireline logging tool can be an expensive proposition.

There has been an increased emphasis on the collection of data during the drilling process. By collecting and processing data during the drilling process, without the necessity of removing or tripping the drilling assembly to insert a wireline logging tool, the driller can make accurate modifications or corrections, as necessary, to optimize performance while minimizing down time. Designs for measuring conditions downhole and the movement and location of the drilling assembly, contemporaneously with the drilling of the well, have come to be known as "measurement-while-drilling" techniques, or "MWD." Similar techniques, concentrating more on the measurement of formation parameters, commonly have been called "logging while drilling" techniques, or "LWD." While distinctions between MWD and LWD may exist, the terms MWD and LWD often are used interchangeably. For this disclosure, the term MWD will be used with the understanding this term encompasses both the collection of formation parameters and the collection of information relating to the movement and position of the drilling assembly.

Drilling oil and gas wells is carried out with drill pipes connected together to form a drill string. Connected to the lower end of the drill string is a drill bit. The bit is rotated and drilling accomplished by either rotating the drill string, or by use of a downhole motor near the drill bit, or by both methods. Drilling fluid, also known as "mud," is pumped down the drill string at high pressures and volumes (e.g., 3000 psi at flow rates of up to 1400 gallons per minute) to emerge through nozzles or jets in the drill bit. The mud then travels back up the borehole via an annulus formed between the exterior of the drill string and the wall of the borehole. On the surface, the mud is cleaned and then recirculated. The mud is used to cool the drill bit, to carry cuttings from the bottom of the borehole to the surface, and to balance the hydrostatic pressure in the rock formations.

When oil wells or other boreholes are being drilled, it is frequently necessary or desirable to determine the direction and inclination of the drill bit and downhole motor so the assembly can be steered in the correct direction. Additionally, information may be required concerning the strata being drilled, such as the formation's resistivity, porosity, density, and its measure of gamma radiation. It is also frequently desirable to know other downhole parameters, such as the temperature and the pressure at the base of the borehole, as examples. Once these data are gathered at the bottom of the bore hole, it is typically transmitted to the surface for use and analysis by the driller.

In MWD systems, sensors or transducers typically are located at the lower end of the drill string. While drilling is in progress, these sensors and transducers continuously or intermittently monitor predetermined drilling parameters and formation data and transmit the information to a surface detector by telemetry. Typically, the downhole sensors employed in MWD applications are positioned in a cylindrical drill collar positioned close to the drill bit. The MWD system employs a system of telemetry in which the data acquired by the sensors is transmitted to a receiver on the surface. Several telemetry systems in the prior art seek to transmit information regarding downhole parameters up to the surface without requiring the use of a wireline tool. Of these, the mud pulse system is one of the most widely used telemetry systems for MWD applications.

The mud pulse system of telemetry creates acoustic signals in the drilling fluid circulated under pressure through the drill string during drilling operations. The information acquired by the downhole sensors is transmitted by suitably timing the formation of pressure pulses in the mud stream. The information is received and decoded by a pressure transducer and computer at the surface.

In a mud pressure pulse system, the drilling fluid pressure in the drill string is modulated with a valve and control mechanism, generally termed a pulser or mud pulser. The pulser is usually mounted in a specially adapted drill collar positioned above the drill bit. Pressures within the mud pulser are typically ported through pressure ports implemented as long, slender holes or a tortuous path drilled through members of the mechanism or tubular in which they are housed. These pressure ports add significant cost because they are difficult to machine, they limit the overall length that can be ported economically, and the port area is limited due to the long, slender holes required to fit within the already long, slender members of the mechanism. Additional, and sometimes complex to machine, components are often required to implement such designs. Extensive disassembly, for cleaning, inspecting, and replacing components, is often required, therefore complicating maintenance. Also,

BRIEF DESCRIPTION OF THE DRAWINGS

FIG. 3 is a cross-sectional view of a mud pulse telemetry valve assembly constructed in accordance with the inventive concepts disclosed herein with a control valve assembly in an open position.

FIG. 4 is a cross-sectional view of the mud pulse telemetry valve assembly of FIG. 3 showing the control valve assembly in a closed position.

DETAILED DESCRIPTION OF EXEMPLARY EMBODIMENTS

Figure 1:
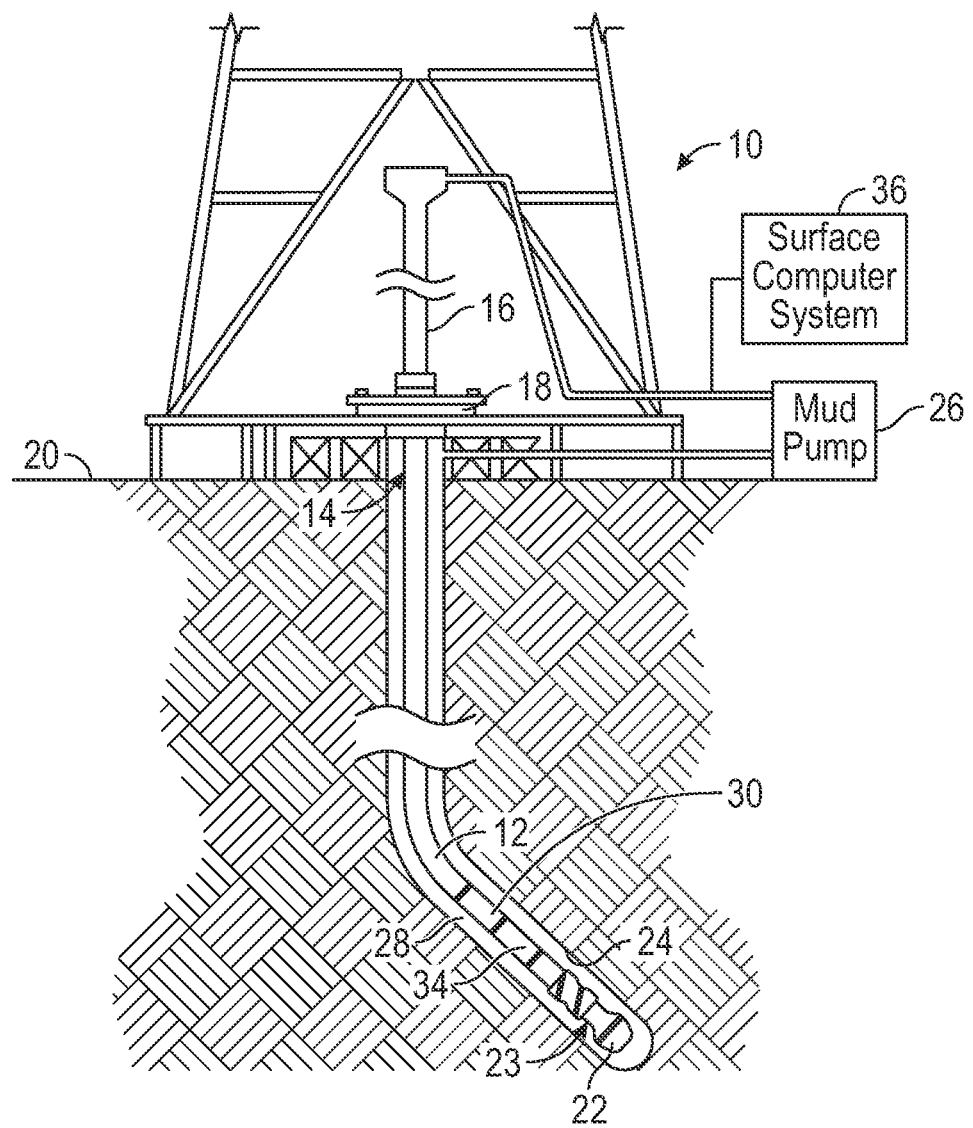
FIG. 1 is a schematic diagram of an exemplary embodiment of a drilling rig having a drill string positioned in a borehole in accordance with the present disclosure.

The inventive concepts disclosed are generally directed to a mud pulse telemetry valve assembly and method comprising a mud valve sub and a mud pulse telemetry valve. The mud valve sub has a first longitudinal axis, a first outer surface, and a first inner surface. The first inner surface defines a first bore extending along the first longitudinal axis. The mud pulse telemetry valve comprises a flow tube having a second longitudinal axis, a second outer surface, and a second inner surface. The second inner surface defines a second bore extending along the second longitudinal axis and has a first diameter. The flow tube is positioned within the first bore in a way that at least a portion of the second outer surface is spaced a distance from at least a portion of the first inner surface to form a hydraulic passageway having an upstream end and a downstream end.

A flow restriction member is positioned in the second bore and defines an orifice having a second diameter less than the first diameter. The orifice has an upstream side and a downstream side.

A control valve assembly is positioned in the second bore downstream of the orifice. The control valve assembly has a valve member axially moveable along the second longitudinal axis between an open position and a closed position to control a flow area between the valve member and the flow restriction member. The hydraulic passageway is in fluid communication with the second bore upstream of the orifice and with the second bore downstream of the orifice.

A pilot valve assembly is operable between an open state and a closed state and is positioned in the second bore between the downstream end of the hydraulic passage and the valve member so when the pilot valve is in the open state, the valve member is in fluid communication with the downstream end of the hydraulic passage to cause the valve member to move to the closed position and so when the pilot valve is in the closed state, the valve member is in non-fluid communication with the downstream side of the hydraulic passageway to cause the valve member to move to the open position.

By positioning the first pump below the surface, the fluid entering the first pump is pre-pressurized due to hydrostatic pressure created by the vertical column of fluid. By taking advantage of the hydrostatic pressure of the fluid, the amount of energy required to pressurize the power fluid for energizing the second pump is significantly reduced. Hydrostatic pressure=g (gravity acceleration)×density of fluid× depth. The constant for gravity acceleration is 0.052. The deeper the first pump is positioned in the well, the greater the pressure of the fluid being drawn into the first pump.

Before explaining at least one embodiment of the inventive concepts disclosed herein in detail, it is to be understood that the inventive concepts are not limited in their application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for the purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Referring now to the drawings, and in particular to FIG. 1, shown therein is an illustration of an embodiment of a drilling rig 10 having a drill string 12 interconnected at one or more sections. A proximal end 14 of the drill string 12 may be secured to a kelly 16. A rotary table 18 may be used to rotate the drill string 12 during advancement of the drill string 12 into the earth 20. Alternatively, a top drive unit (not shown) may be used to rotate the drill string 12. A drill bit 22 is positioned on a distal end 23 of the drill string 12. The drill bit 22 is advanced through surrounding earth 20 forming a bore 24.

The drilling rig 10 shown in FIG. 1 includes a mud pump 26. The mud pump 26 may include, for example, one or more pistons providing mud to flow through the drill string 12 to the distal end 23 of the drill string 12. It should be noted the mud pump 26 may use other techniques for providing mud to flow through the drill string 12 and/or the distal end 23 of the drill string 12. The mud may flow out through the drill bit 22 and return to the surface through an annulus 28 formed between the bore 24 and the drill string 12.

Figure 2:
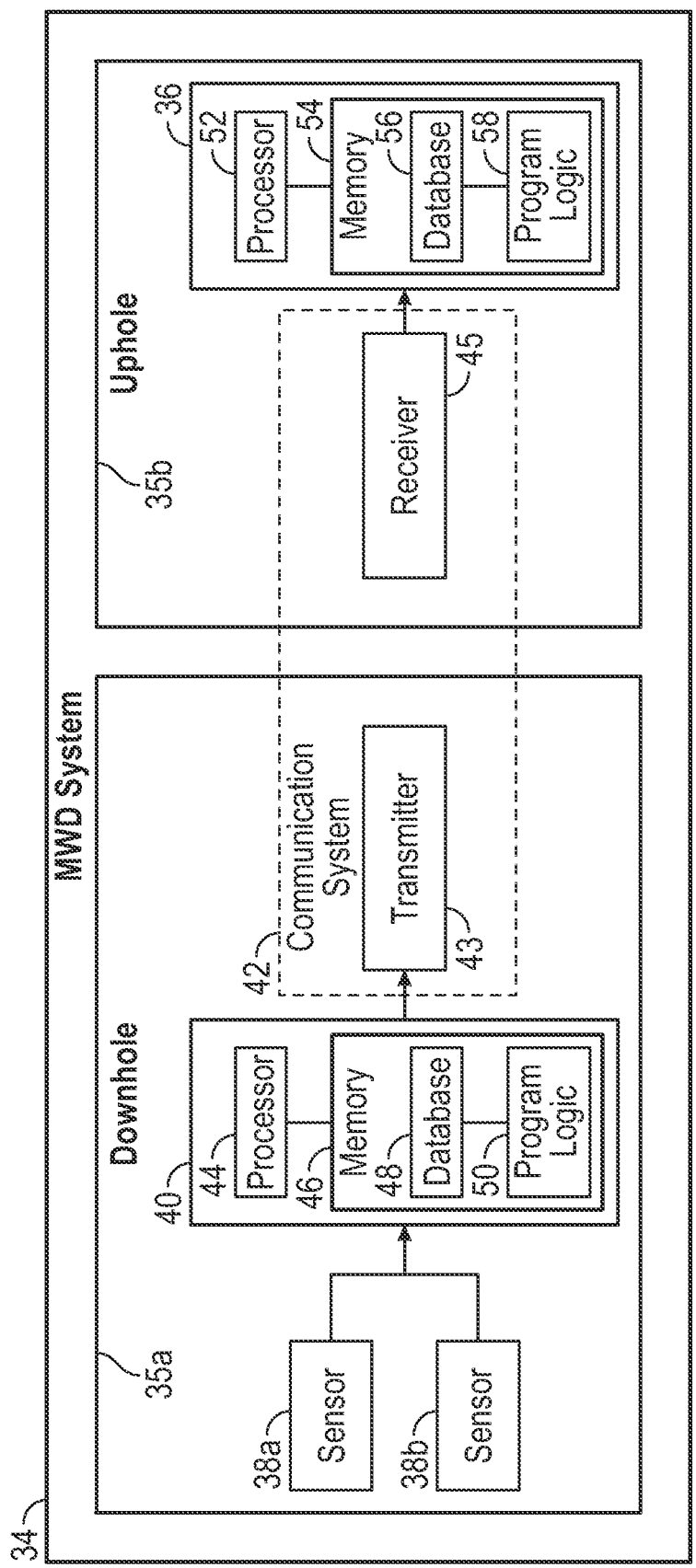
FIG. 2 is a block diagram of an exemplary embodiment of a measurement while drilling system positioned downhole in communication with a surface computer system at a surface of the drilling rig.

Referring now to FIGS. 1 and 2, in the embodiment shown, the drilling rig 10 includes a measurement while drilling (MWD) system 34 and a mud pulse telemetry valve assembly 30 constructed in accordance with the inventive concepts disclosed herein. In this embodiment, the MWD system 34 includes a downhole system 35a mounted as part of the drill string 12 and a surface system 35b at the surface of the earth 20. The downhole system 35a includes at least one sensor 38a and 38b, at least one downhole computer system 40, and a communication system 42. Generally, the downhole computer system 40 uses the at least one sensor 38a and 38b to determine data, such as data indicative of location and orientation (e.g., inclination, azimuth) of the drill bit 22 within the borehole 24. The data is then transmitted as one or more data orders within one or more data series by the communication system 42 to a surface computer system 36 of the surface system 35b via, for instance, mud pulse telemetry. The communication system 42 may include a transmitter 43 in the downhole system 35a and a receiver 45 in the surface system 35b. The transmitter 43 may transmit one or more data series from the downhole computer system 40 to the receiver 45. In this example, the receiver 45 receives, decodes and/or provides the one or more data series to the surface computer system 36.

Referring to FIG. 2, the downhole computer system 40 and the surface computer system 36 includes a system or systems able to embody and/or execute the logic of the processes described herein. Logic embodied in the form of software instructions and/or firmware may be executed on any appropriate hardware. For example, logic embodied in the form of software instructions and/or firmware may be executed on dedicated system or systems, on a single processing computer system, a distributed processing computer system, and/or the like. In some embodiments, logic may be implemented in a stand-alone environment operating on a single computer system and/or logic may be implemented in a networked environment such as a distributed system using multiple computers and/or processors.

The downhole computer system 40 and the surface computer system 36 may each include at least one processor 44 and 52 working together, or independently to, execute processor executable code, and may each include non-transitory computer readable memory 46 and 54 capable of storing processor executable code.

Each element of the surface computer system 36 may be partially or completely network-based or cloud based, and may or may not be located in a single physical location downhole.

In some embodiments, the downhole computer system 40 and the one or more processor 44 may communicate with the at least one sensor 38a and 38b via a network. As used herein, the terms "network-based," "cloud-based," and any variations thereof, are intended to include the provision of configurable computational resources on demand via interfacing with a computer and/or computer network, with software and/or data at least partially located on the computer and/or computer network.

An I/O port and/or the network may permit bi-directional communication of information and/or data between the processor 44, the at least one sensor 38a and 38b, and the communication system 42. The I/O ports and/or the network may interface with the processor 44, the at least one sensor 38a and 38b, and the communication system 42 in a variety of ways. For example, interfacing may be by optical and/or electronic interfaces, one or more buses and/or may use a plurality of network topographies and/or protocols. For example, in some embodiments, the network may be implemented as a local area network (LAN). Additionally, the I/O port and/or the network may use a variety of protocols to permit bi-directional interface and/or communication of data and/or information between the processor 44, the at least one sensor 38a and 38b, and the downhole communication system 42.

Each of the processors 44 and 52 may be implemented as a single processor or multiple processors working together, or independently, to execute the logic as described herein. It is to be understood, that in certain embodiments using more than one processor 44 within the downhole computer system 40, the processors 44 may be located in the same location, or comprising a unitary multi-core processor. Similarly, using more than one processor 52 within the surface computer system 36, the processors 52 may be located remotely from one another, located in the same location, or comprising a unitary multi-core processor. The processor 44 may be capable of reading and/or executing processor executable code and/or capable of creating, manipulating, and retrieving, altering, and/or storing data structure into the non-transitory computer readable memory 46 and 54 respectively.

Exemplary embodiments of the processors 44 and 52 may include, but are not limited to, a digital signal processor (DSP), a central processing unit (CPU), a field programmable gate array (FPGA), a microprocessor, a multi-core processor, combinations thereof, and/or the like, for example. The processors 44 and 52 may be capable of communicating with the non-transitory computer readable memory 46 and 54 respectively via a path (e.g., data bus).

The non-transitory computer readable memory 46 and 54 may be capable of storing processor executable code. Additionally, the non-transitory computer readable memory 46 and 54 may be implemented as a conventional non-transient memory. For example, the non-transitory computer readable memory 46 and 54 may be implemented as random access memory (RAM), a CD-ROM, a hard drive, a solid-state drive, a flash drive, a memory card, a DVD-ROM, a floppy disk, an optical drive, combinations thereof, and/or the like.

In some embodiments, the non-transitory computer readable memory 46 of the downhole computer system 40 may be located in the same physical location as the processor 44. The non-transitory computer readable memory 54 of the surface computer system 36 may be located in the same physical location as the processor 52, and/or the non-transitory computer readable memory 54 may be located remotely from the processor 52. For example, non-transitory computer readable memory 54 may be located remotely from the processor 52 and communicate with the processor 52 via a network (e.g., a local area network or a wide-area network such as the internet). Additionally, when more than one non-transitory computer readable memory 46 is used in the downhole computer system 40, a first non-transitory computer readable memory may be located in the same physical location as the processor 44, and additional non-transitory computer readable memory 46 may be located elsewhere in the drill string 12. When more than one non-transitory computer readable memory 54 is used in the surface computer system 36, a first non-transitory computer readable memory may be located in the same physical location as the processor 52, and additional non-transitory computer readable memory 54 may be located in a remote physical location from the processor 52.

The non-transitory computer readable memory 46 and 54 may store processor executable code and/or information comprising one or more database 48 and 56, respectively, and program logic 50 and 58, respectively. In some embodiments, the processor executable code may be stored as a data structure, such as a database and/or a data table, for example. In some embodiments, outputs of the at least one sensor 38a and 38b may be stored in one or more database 48 within the one or more non-transitory computer readable memory 46.

The downhole computer system 40 may initiate transmission of a signal stream having one or more data series by the processor 44 commanding the transmitter 43 of the communication system 42 to send the data. Data may be transmitted as a series of signals by mud pulse telemetry as discussed below with the series of signals being pulses.

In general, the at least one sensor 38a and 38b of the MWD system 34 may provide data to the downhole computer system 40. Using the sensor data, the downhole computer system 40 may determine one or more data series (e.g., survey data series, drilling data series) having one or more data orders (e.g., inclination, azimuth, magnetic field, gravity field). Each data series may be stored in the downhole computer system 40 for transmission as a signal stream to the surface computer system 36 via the transmitter 43 of the communication system 42. Each data series may be capable of being received by the receiver 45 of the communication system 42.

The communication system 42 may include circuitry and equipment to transfer the data using techniques known in the art. For example, the communication system 42 may use mud pulse telemetry (e.g., the mud pulse telemetry valve assembly 30). Mud pulse telemetry uses circuitry and components to control a valve which produces pressure pulses in the drilling mud travelling from transmitter 43 downhole to the surface of the earth 20 where the receiver 45 receives the pressure pulses and the computer system 36 interprets the pressure pulses.

Referring now to FIGS. 3 and 4, the mud pulse telemetry valve assembly 30 is illustrated. The mud pulse telemetry valve assembly 30 includes a mud valve sub 60 and a mud pulse telemetry valve 80. The mud valve sub 60 may be formed of a suitable tubular material and is provided with an inner surface 62, an outer surface 64, a first end 66, a second end 68, and a first bore 70. In the example shown, the inner surface 62 of the mud valve sub 60 further comprises a first shoulder 72 and a second shoulder 74.

In the embodiment shown, the outer surface 64 of the mud valve sub 60 forms a substantially cylindrical structure and the inner surface 62 of the mud valve sub 60 forms a substantially cylindrical surface which defines the first bore 70. The mud valve sub 60 may be characterized as having a longitudinal axis extending from the first end 66 to the second end 68. The first bore 70 extends along the longitudinal axis of the mud valve sub 60 and is characterized as having a first diameter 76 extending from the first end 66 to the first shoulder 72, a second diameter 78 extending from the first shoulder 72 to the second shoulder 74, and a third diameter 79 extending from the second shoulder 74 to the second end 68. The second diameter 78 is less than the first diameter 76 and the third diameter 79 is less than the second diameter 78.

The mud pulse telemetry valve 80 has a first end 81, a second end 82, and a longitudinal axis extending therebetween. The longitudinal axis of the mud pulse telemetry valve 80 will be referred to as a second longitudinal axis to differentiate it from the longitudinal axis of the mud valve sub 60, which will hereinafter be referred to as the first longitudinal axis. Broadly, the mud pulse telemetry valve 80 has a screen assembly 90, a flow tube 92, a flow restriction member 94, a control valve assembly 96, and a pilot valve assembly 97.

The mud pulse telemetry valve 80 is disposed within the first bore 70 of the mud valve sub 60 so the screen assembly 90 and the flow tube 92 of the mud pulse telemetry valve 80 are surrounded by and in contact with the inner surface 62 of the mud valve sub 60. The mud pulse telemetry valve 80 may be secured within the mud valve sub 60 via at least one set screw 102 deployed within at least one recess 104. In some embodiments, the at least one set screw 102 threadingly engages the flow tube 92 of the mud pulse telemetry valve 80.

Figure 5:
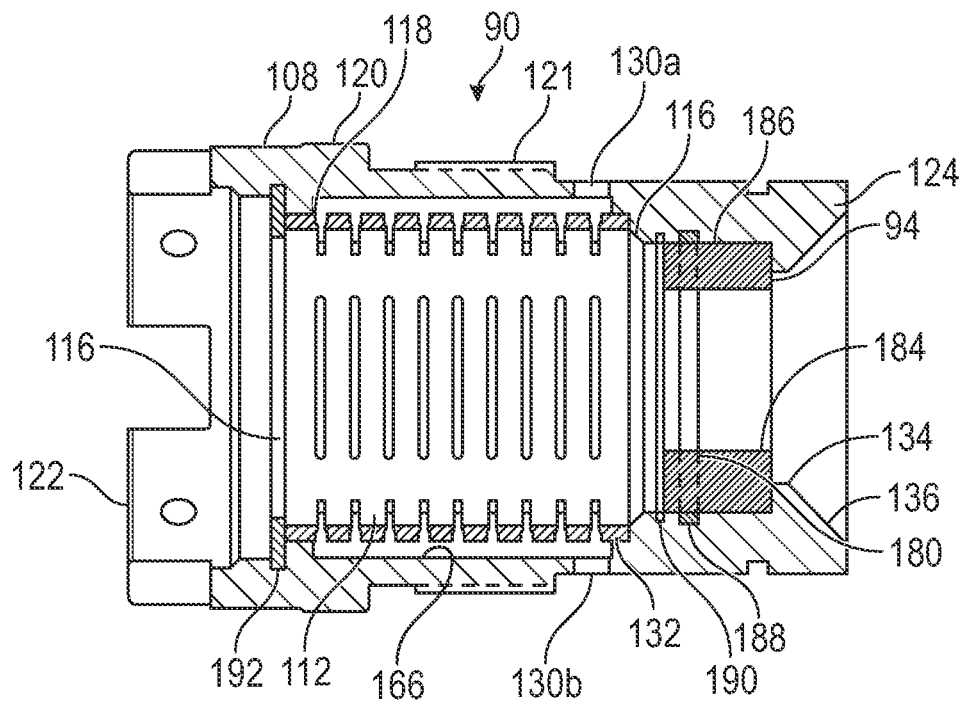
FIG. 5 is a side-elevational, partial cross-sectional view of a screen assembly of the mud pulse telemetry valve assembly of FIG. 3.
Figure 6:
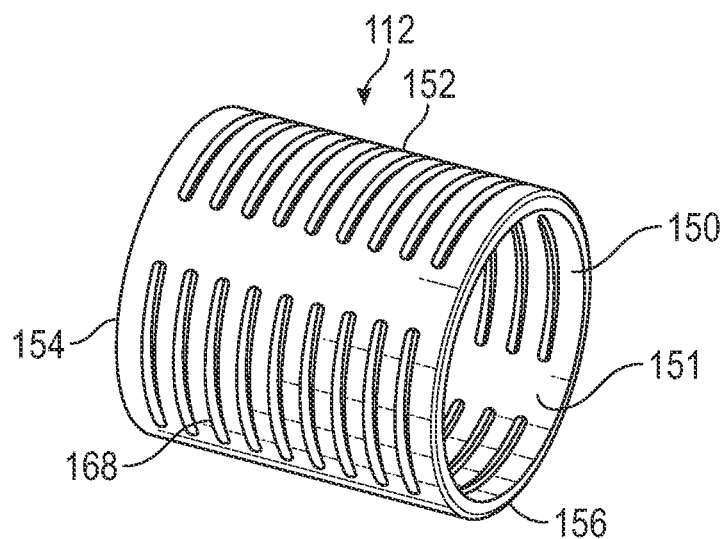
FIG. 6 is a perspective view of a screen of the screen assembly of FIG. 5.

Referring now to FIGS. 5 and 6, the screen assembly 90 of the mud pulse telemetry valve 80 may include a screen housing 108, a screen 112, and a screen retainer 116. The screen housing 108 may have an inner surface 118, an outer surface 120, a threaded portion 121, a first end 122, a second end 124, and at least one hydraulic opening 130a and 130b. The inner surface 118 of the screen housing 108 may be provided with a first shoulder 132, a second shoulder 134, and a beveled opening 136. The screen 112 has an inner surface 150, a bore 151, an outer surface 152, a first end 154, a second end 156, and a plurality of openings 168.

The flow restriction member 94 has an upstream end, a downstream end, and an orifice 184. In one embodiment, the flow restriction member 94 may be removably deployed within the screen housing 108 with an outer surface of the flow restriction member 94 engaging the inner surface 118 of the screen housing 108 and the downstream end of the flow restriction member 94 engaging the second shoulder 134 of the screen housing 108. A seal 188 may be formed of an appropriate material such as, for instance rubber, and may be configured to sealingly engage with the inner surface 118 of the screen housing 108 to form a fluid impervious seal. The flow restriction member 94 may be secured within the screen housing 108 using, for instance, a lock ring 190.

The screen 112 may be removably deployed within the screen housing 108 with at least a portion of the outer surface 152 of the screen 112 being in contact with the inner surface 118 of the screen housing 108. The screen 112 may be seated against and in contact with the first shoulder 132 of the screen housing 108. The outer surface 152 of the screen 112 may be in a spaced apart relation relative to the inner surface 118 of the screen housing 108 to form an annular recess 166 for the flow of drilling mud into the at least one hydraulic opening 130a and 130b. The plurality of openings 168 of the screen 112 may be sized and configured to prevent lost circulation material (LCM) or debris that may be present in the drilling mud from clogging or damaging the at least one hydraulic opening 130a and 130b. The screen 112 may be manufactured in different embodiments wherein the plurality of openings 168 may be provided with different sizes and/or configurations in each embodiment. In addition, in another embodiment (not shown), multiple screens 112 may be used within the mud pulse telemetry valve 80 wherein the plurality of openings 168 of each screen 112 are provided with different sizes and/or configurations.

Because the flow tube 92 cooperates with the mud valve sub 60 to form the hydraulic passageway 93, the inner diameter of the screen 112 may be increased relative to prior art devices that port the pressure through a tubular member in the flow path. A larger diameter can cause a higher actuating pressure differential. Also, by increasing the diameter of the screen 112, the screen 112 may have an enhanced surface area and thus more openings 168. More openings 168 can mean less pressure drop with flow through the screen 112 and a decreased chance of clogging due to the increased number of openings 112. Also, the screen 112 may last longer as the velocity of fluid flowing across the surface of the screen 112 is less due to the increased flow.

Figure 7A:
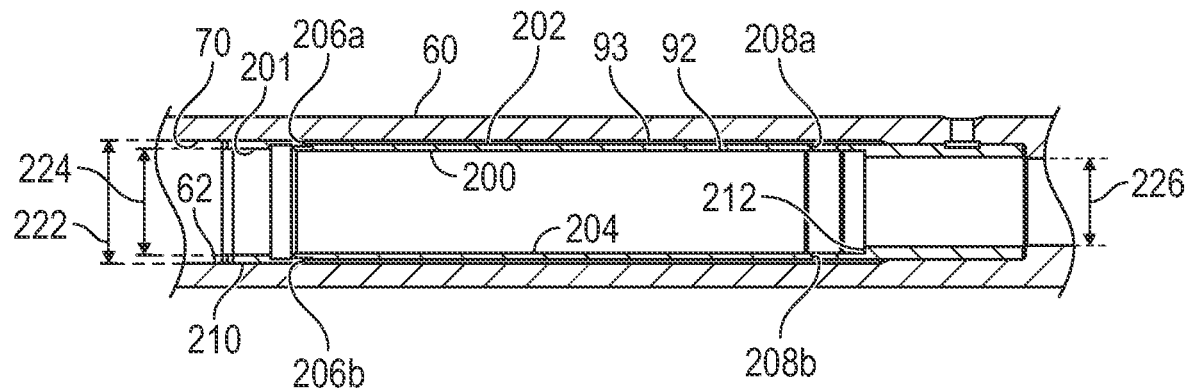
FIG. 7A is a cross-sectional view of a mud valve sub and a flow tube.
Figure 7B:
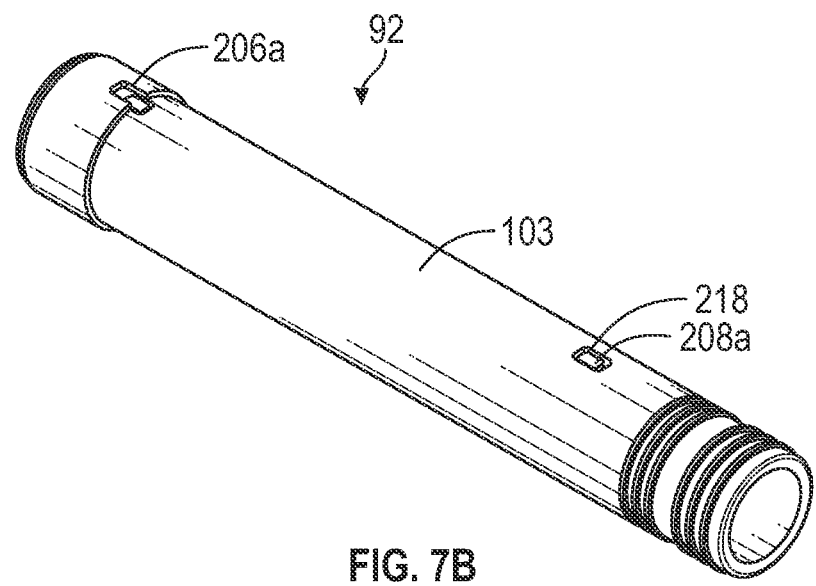
FIG. 7B is a perspective view of the flow tube.

Referring now to FIGS. 7A and 7B, the flow tube 92 of the mud pulse telemetry valve 80 is formed of a suitable material and includes an inner surface 200, a threaded portion 201, an outer surface 202, a bore 204, at least one upper hydraulic opening 206a and 206b, at least one lower hydraulic opening 208a and 208b, a collar portion 210, and a shoulder 212. When the flow tube 92 is deployed within the mud valve sub 60, at least one annular hydraulic passageway 93 is formed between the inner surface 62 of the mud valve sub 60 and the outer surface 202 of the flow tube 92 from the collar 210 to the shoulder 72 of the mud valve sub 60.

The inner surface 200 of the flow tube 92 may form a substantially tubular surface which defines the bore 204. The bore 204 may be characterized as having a first diameter 222 extending from a first end to the at least one hydraulic opening 206a and 206b, a second diameter 224 extending from the at least one hydraulic opening 206a and 206b to the shoulder 212, and a third diameter 226 extending from the shoulder 212 to a second end.

Referring again to FIGS. 3 and 4, a tubular liner 194 may be provided. The liner 194 is removably deployed within at least a portion of the central bore 204 of the flow tube 92 wherein an outer surface 242 of the liner 194 may be in contact with the inner surface 200 of the flow tube 92. To facilitate a fluid tight seal, the liner 194 may further be provided with a plurality of seals 248 configured to sealingly engage the outer surface 242 with the inner surface 200 of the flow tube 92.

Figure 8:
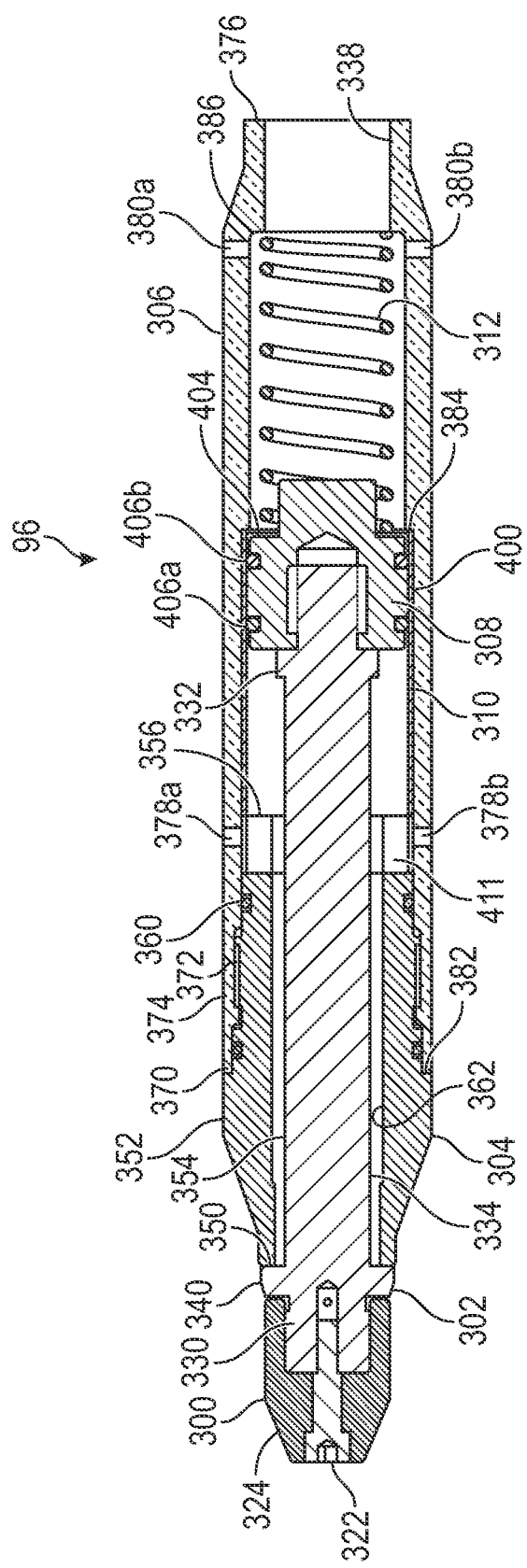
FIG. 8 is a cross-sectional view of the control valve assembly.

Referring now to FIG. 8, the control valve assembly 96 has a poppet valve 300, a shaft 302, a shaft housing 304, a piston housing 306, a piston 308, a piston sleeve 310, and a spring 312. The poppet valve 300 may be attached to the shaft 302 with a screw 322. The shaft 302 has a first end 330, a second end 332, an outer surface 334, and a shoulder 340.

The shaft housing 304 has a first end 350, an outer surface 352, an inner surface 354, a second end 356, a shoulder 382, and a plurality of grooves 360 for receiving seals. The inner surface 354 of the shaft housing 304 may form a substantially tubular shape which defines a bore 362 extending from the first end 350 to the second end 356.

The piston housing 306 has a first end 370, an inner surface 372, an outer surface 374, a second end 376, at least one upper pressure relief port 378a and 378b, a first shoulder 384, and a second shoulder 386, and at least one lower pressure relief port 380a and 380b. The inner surface 372 may be threaded to matingly engage a corresponding portion of the shaft housing 304 for connecting the piston housing 306 to the shaft housing 304.

The piston 308 is connected to the second end 332 of the shaft 320 and has an outer surface 400, a spring retainer portion 404, and at least one piston ring/seal 406a and 406b.

The piston sleeve 310 of the poppet valve assembly 96 may form a substantially tubular member and may be constructed of a suitable material. The piston sleeve 310 may be provided with an inner diameter and an outer diameter wherein the outer diameter is substantially the same as at least a portion of the inner surface 372 of the piston housing 306 and the inner diameter is substantially the same as at least a portion of the outer surface 400 of the piston 308. The piston sleeve 310 is optional to the function of the device. It is a wear resistant member that experiences severe abrasion and may be replaced as needed.

As illustrated in FIG. 8, the control valve assembly 96 may be assembled in the following manner. The spring 312 may be deployed within the piston housing 306 and secured to the second shoulder 386. The piston sleeve 310 may be deployed within the piston housing 306 and seated against the first shoulder 384. The piston 308 may be deployed within the piston sleeve 310 in a concentric relationship wherein the at least one piston ring 406a and 406b may slidingly engage the inner diameter of the piston sleeve 310 allowing the piston 308 to slide within the piston sleeve 310 in a rectilinear motion. The spring 312 may be secured about the spring retainer portion 404 of the piston 308. The shaft housing 304 may be secured within the piston housing 306 via the threads 372 or other suitable fasteners. The second end 356 of the shaft housing 302 extends to 'capture' the piston sleeve 310 and is provided with a plurality of slots 411. The slots 411 have an outer recess and align with the vents 378 to ensure hydraulic communication.

At least a portion of the shaft 302 may be deployed within and concentrically surrounded by the inner surface 354 of the shaft housing 304. At least a portion of the outer surface 334 of the shaft 302 may be in contact with the inner surface 354 of the shaft housing 304. At least a portion of the shaft 302 may extend into the piston sleeve 310 with the outer surface 334 of the shaft 302 being in a spaced apart relationship relative to the piston sleeve 310. The second threaded portion 338 of the shaft 302 may threadingly connect to the threaded surface 402 of the piston 308.

Figure 9:
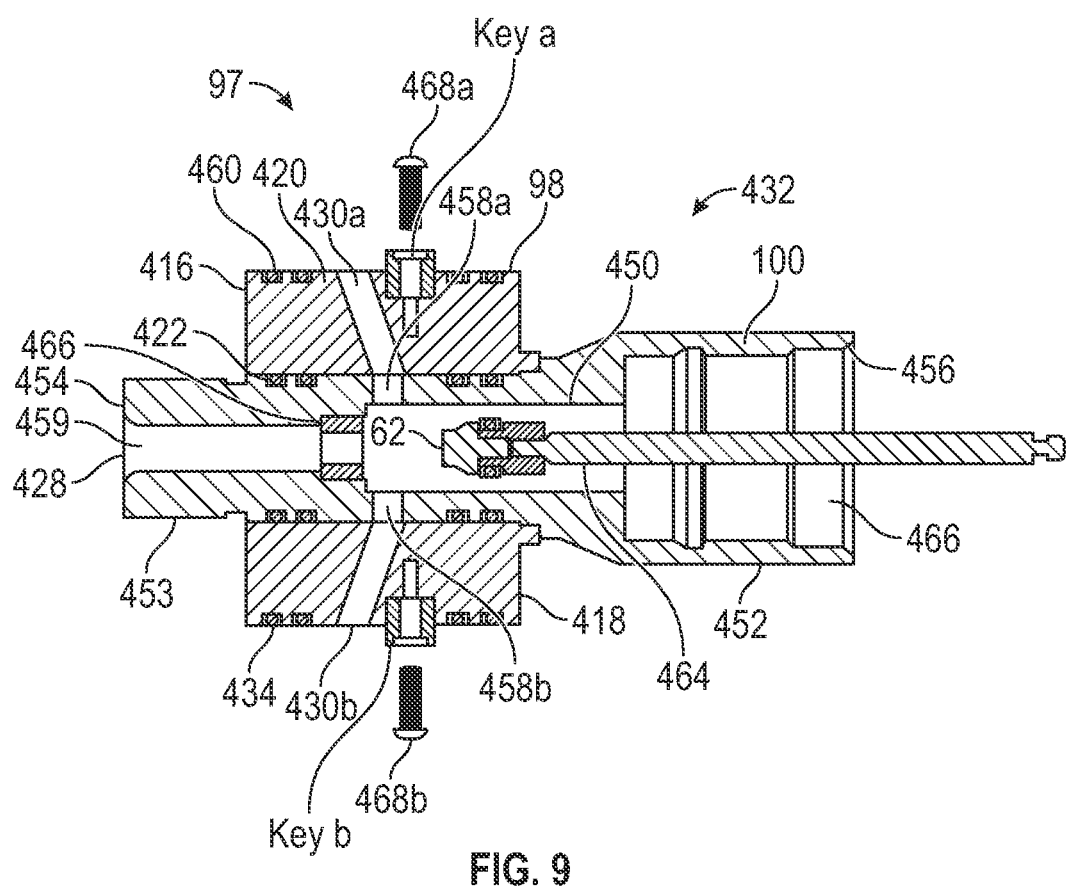
FIG. 9 is a cross-sectional view of a pilot valve assembly.
Figure 10A:
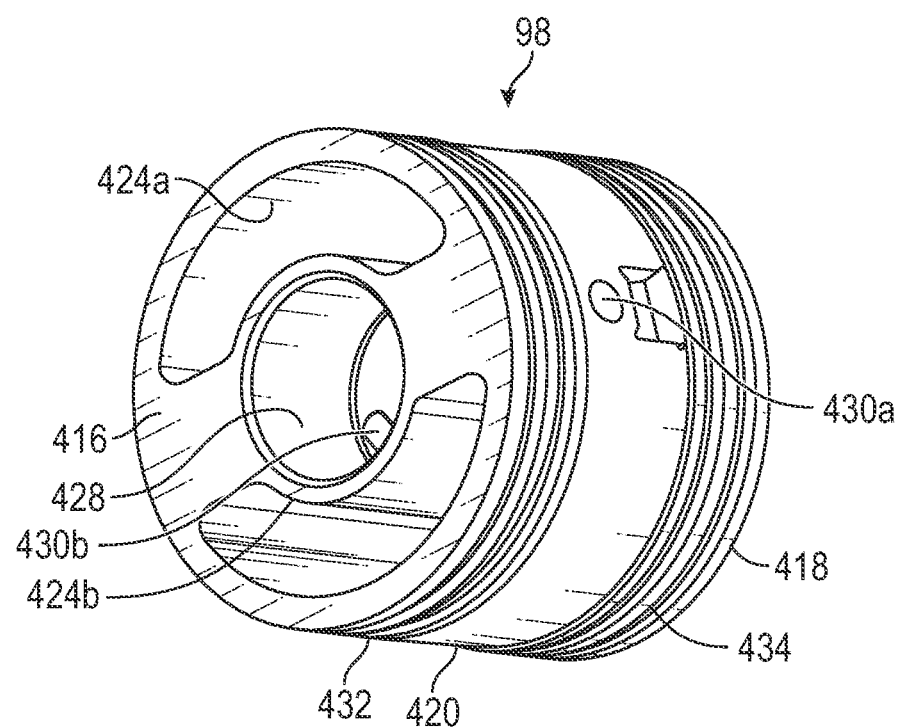
FIG. 10A is a front perspective view of a hanger ring of the pilot valve assembly.
Figure 10B:
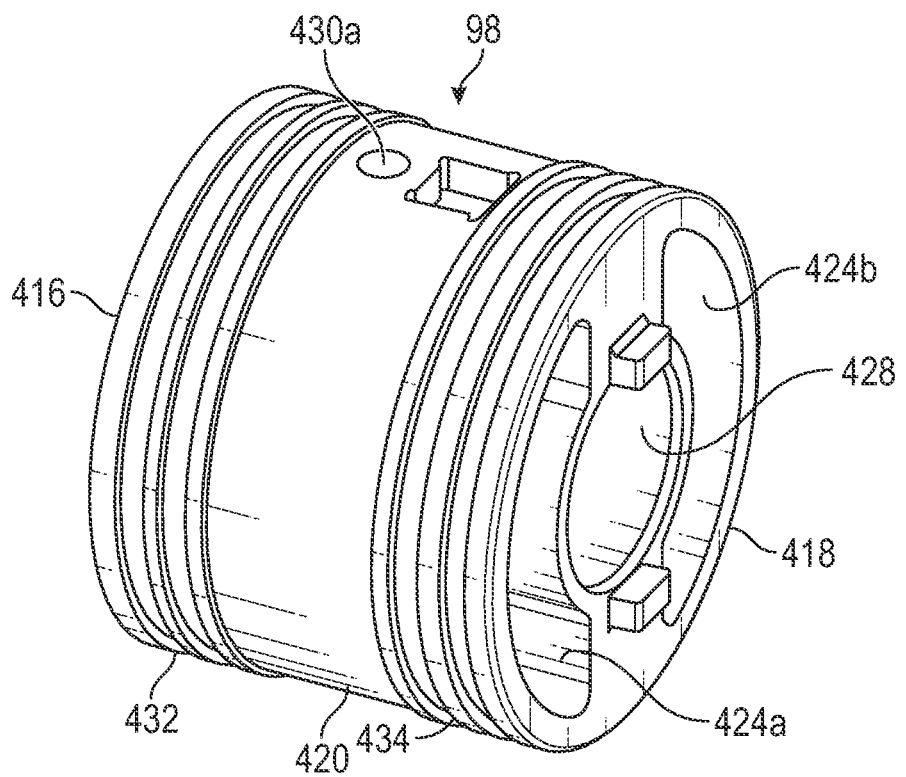
FIG. 10B is a rear perspective view of the hanger ring of the pilot valve assembly.

Referring now to FIGS. 9, 10A, and 10B, the pilot valve assembly 97 is operable between an open state and a closed state. The pilot valve assembly 97 is positioned in the second bore between the downstream end of the hydraulic passage 93 and the valve member 300 so when the pilot valve assembly 97 is in the open state, the valve member 300 is in fluid communication with the downstream end of the hydraulic passage 93 to cause the valve member 300 to move to a closed position (FIG. 4) and so when the pilot valve assembly 97 is in the closed state, the valve member 300 is in non-fluid communication with the downstream side of the hydraulic passageway 93 to cause the valve member 300 to move to an open position (FIG. 3).

The pilot valve assembly 97 may include a pilot valve port housing 98 and a pilot valve housing 100. The pilot valve port housing 98 has a first end 416, a second end 418, an outer surface 420, at least one mud flow port 424a and 424b, a central bore 428, at least one lateral hydraulic communication path 430a and 430b, and a pair of seal assemblies 432 and 434 positioned on either side of the lateral hydraulic communications paths 430a and 430b.

The pilot valve housing 100 has an inner surface 450, an outer surface 452, a threaded portion 453, a first end 454, a second end 456, at least one hydraulic communication path 458a and 458b, a central hydraulic communication path 459, a plurality of seals 460, a pilot valve 462, a pilot valve shaft 464, a pilot valve seat 466, and at least one set screw 468a and 468b. The housings 98 and 100 100 are held together when the piston housing threads 388 are torqued onto the threads 453.

The pilot valve housing 100 may be removably deployed within the central bore 428 of the pilot valve port housing 98 with at least a portion of the outer surface 452 of the pilot valve housing 100 in contact with the central bore 428. To facilitate a fluid tight seal, the plurality of seals 460 of the pilot valve housing 100 may be deployed in sealing engagement with the central bore 428. When secured in the central bore 428, the at least one hydraulic communication path 458a and 458b of the pilot valve housing 100 will be substantially aligned with the at least one hydraulic communication path 430a and 430b of the pilot valve port housing 98. Alternatively, an annular clearance is formed between the pilot valve port housing 98 and the pilot valve assembly 100 with seals, thereby eliminating the need for alignment.

The pilot valve 462 is operated by a pilot valve actuator (not shown). The pilot valve actuator may be any suitable device for receiving electrical signals and generating a predetermined movement of the pilot valve 462 via the shaft 464. For example, the pilot valve actuator may be a solenoid operated unit which receives electrical input signals and produces a linear movement of the pilot valve 462 towards or away from the pilot valve actuator. The pilot valve 462 may be attached to the solenoid via the shaft 464. In some embodiments, valves that use rotary movement to open and close could be employed.

Referring now to FIGS. 3, 4, 8, and 9, the control valve assembly 96 may be removably attached to the pilot valve port housing 98 and the pilot valve assembly 100 (assembled as described above and illustrated in FIGS. 3, 4, and 9) wherein the threaded portion 388 of the piston housing assembly 96 threadingly engages the threaded portion 453 of the pilot valve housing 100 and the second end 376 of the piston housing 306 is seated against the first end 416 of the pilot valve port housing 98.

Referring now to FIGS. 3-10, the mud pulse telemetry valve 80 may be assembled in the following manner. The pilot valve port housing 98, the pilot valve assembly 100, and the control valve assembly 96, being assembled as described above, may be removably deployed within the flow tube 92 with at least a portion of the tab 432 of the pilot valve port housing 98 inserted into a seating notch 218 of the flow tube 92 to ensure proper alignment of the pilot valve port housing 98. Proper alignment of the pilot valve port housing 98 within the flow tube 92 ensures that the at least one hydraulic communication path 206a and 206b of the flow tube 92 is substantially aligned with the at least one hydraulic communication path 430a and 430b of the pilot valve port housing 98.

The liner 194 may be removably deployed within at least a portion of the bore 204 of the flow tube 92 in the manner described above. The second end of the liner 194 may be seated against at least a portion of the first end 416 of the pilot valve port housing 98.

The screen assembly 90 may be removably deployed within at least a portion of the flow assembly 92. The threaded portion 121 of the screen assembly 90 may threadingly engage the threaded portion 201 of the flow tube 92 to secure the screen assembly 90 to the flow tube 92. When the mud pulse telemetry valve 80 is assembled with the mud valve sub 60, the hydraulic passageway 93 is formed and the at least one hydraulic opening 130a and 130b of the screen housing 108 of the screen assembly 90 is in fluid communication with the hydraulic openings 206a and 206b, respectively. The at least one hydraulic passageway 93 of the mud pulse telemetry valve 80 has an upstream end beginning at the at least one hydraulic opening 130a and 130b of the screen housing 108 of the screen assembly 90, and a downstream end adjacent to the at least one hydraulic communication path 458a and 458b of the pilot valve housing assembly 100.

Referring now to FIGS. 1-10, in operation, the mud pulse telemetry valve assembly 30 may be used to selectively interrupt or obstruct the flow of drilling mud through the drill string 12, to thereby produce encoded pressure pulses in the form of acoustic wave signals. The mud pulse telemetry valve assembly 30 is selectively operated in response to the data encoded electrical output of the at least one downhole computer system 40 to generate a corresponding encoded wave signal. This encoded signal is transmitted to the surface through the medium of the drilling mud flowing in the drill string 12, as a series of pressure pulse signals, which preferably are encoded representations of measurement data indicative of the downhole drilling parameters and formation characteristics measured by the at least one sensor 38a and 38b. The presence or absence of a pressure pulse in a particular interval or transmission bit may be used to indicate a binary "0" or a binary "1" in accordance with conventional techniques. When these pressure pulse signals are received at the surface, they are detected, decoded and converted into meaningful data by the receiver 45 and the surface computer system 36.

Typically, drilling mud flows through the mud pulse telemetry valve assembly 30 by flowing through the bore 151 of the screen 112, through the orifice 184 of the flow restriction member 94, around the control valve assembly 96, and through the at least one mud flow port 424a and 424b of the pilot valve port housing 98. The flow of mud, however, may be restricted or obstructed by the poppet valve 300 and flow restriction member 94. The poppet valve 300, when extended into a closed position illustrated in FIG. 4, restricts the flow of mud through the orifice 184.

To close the mud pulse telemetry valve assembly 30, the at least one hydraulic passageway 93 provides a mud flow path bypassing the poppet valve 300 and the flow restriction member 94 and reaching the piston 308. A pressure difference is created when a fluid passes through a restriction such as the orifice 184 of the flow restriction member 94. The point of maximum developed differential pressure is between the upstream end and the downstream end of the flow restriction member 94. The mud flowing through the at least one hydraulic passageway 93 enters above the orifice 184 of the flow restriction member 94 and therefore has a pressure higher than the mud flowing past the poppet valve 300 which has passed through the restriction of the orifice 184. As a result, the pressure on the piston 308 is greater than the force provided by pressure on the poppet valve 300 and the piston 308 tends to remain in an extended position, causing the poppet valve 300 to remain in a closed position relative to the orifice 184 of the flow restriction member 94.

As illustrated in FIG. 3, the poppet valve 300 retracts when the pilot valve 462 is extended to a closed position thereby preventing mud flowing through the at least one hydraulic passageway 93 from communicating with the downstream end of the piston 308. When the pilot valve 462 is in the closed position, the pressure on the piston 308 is reduced and the spring 312 retracts the piston 308 as the force on the poppet valve 300 exceeds the force provided by pressure on the piston 308. With the poppet valve 300 in the open position relative to the orifice 184 of the flow restriction member 114, the mud pulse telemetry valve assembly 30 is in an open position.

By selectively operating the pilot valve 462 between the open position and the closed position, the pressure across the piston 308 may be manipulated and the poppet valve 300 may be selectively opened and closed thereby allowing data in the form of pressure pulses to be transmitted to the surface.

In one embodiment of the mud pulse telemetry valve 80, the at least one upper pressure relief port 378a and 378b, and the at least one lower pressure relief port 380a and 380b of the piston housing 306 may be provided to regulate the pressure on the piston 308. The at least one upper pressure relief port 378a and 378b and at least one lower pressure relief port 380a and 380b may have a cross-sectional area designed to ensure that the pressure on the piston 308 does not reach a level that may damage the piston 308 or other parts of the mud pulse telemetry valve 80. In addition, the at least one upper pressure relief port 378a and 378b, and at least one lower pressure relief port 380a and 380b may be configured to manipulate the pressure differential between the piston 308 and the poppet valve 300 thereby facilitating operation of the mud pulse telemetry valve 80.

Similarly, the mechanical configuration of the at least one hydraulic passageway 93 may also be manipulated to regulate the pressure applied to the piston 308. For example, the at least one hydraulic passageway 93 may be formed as helical grooves, rather than as an annular channel, to increase the length of the at least one hydraulic communication passageway.

In one embodiment of the mud pulse valve 80, the at least one hydraulic passageway 93 may be configured having a reduced diameter, a taper, or similar geometry between the at least one hydraulic communication path 214a and 214b and the inner surface 62 of the mud valve sub 60. This will ease the disassembly of the mud pulse telemetry valve assembly 30 by eliminating or greatly reducing the shear/wipe action on the drilling mud and debris that may be in the at least one hydraulic passageway 93.

While the at least one hydraulic passageway 93 of the mud pulse telemetry valve assembly 30 has been described herein as annular, it will be recognized by a person of skill in the art that the modular nature of the present invention would allow the at least one hydraulic passageway 93 to be formed having other shapes, such as, for instance, a hex, an oval, or non-concentric.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and/or defined in the appended claims.

What is claimed is:

1. A mud pulse telemetry valve, comprising:
   a flow tube having a longitudinal axis, an outer surface, and an inner surface, the inner surface defining a bore extending along the longitudinal axis and having a first diameter, the flow tube having at least one upper hydraulic opening extending from the inner surface and at least one lower hydraulic opening extending from the inner surface;
   a flow restriction member positioned in the bore and defining an orifice having a second diameter less than the first diameter, the orifice having an upstream side and a downstream side;
   an orifice housing connected to the flow tube and supporting the flow restriction member, the orifice housing having at least one inlet port in fluid communication with the upper hydraulic opening upstream of the flow restriction member; and
   a screen having a first end, and second end, and a sidewall defining a flow path from the first end to the orifice of the flow restriction member, the sidewall having a plurality of filter openings positioned between the flow path and the at least one inlet port;
   a control valve assembly positioned in the bore downstream of the orifice, the control valve assembly having a valve member axially moveable along the second longitudinal axis between an open position and a closed position to control a flow area between the valve member and the flow restriction member; and
   a pilot valve assembly operable between an open state and a closed state, the pilot valve assembly positioned in the second bore between the downstream end of the hydraulic passage and the valve member.

2. The mud pulse telemetry valve of claim 1, wherein the screen is slidably removable from the orifice housing.

3. The mud pulse telemetry valve of claim 2, further comprising a retaining ring engaged with the orifice housing and the screen to retain the screen in the orifice housing.

4. The mud pulse telemetry valve of claim 1, wherein the pilot valve assembly has a hanger ring interposed between the at least one lower hydraulic opening and the control valve assembly, the hanger ring having at least one port aligned with the at least one lower hydraulic opening of the flow tube to provide fluid communication between the at least one lower hydraulic opening and the valve member.

5. The mud pulse telemetry valve of claim 1, wherein the flow tube has at least two upper hydraulic openings extending therethrough from the inner surface.

6. The mud pulse telemetry valve of claim 1, wherein the flow tube has at least two lower hydraulic openings extending from the inner surface, and wherein the hanger ring has at least two ports aligned with the at least two lower hydraulic openings of the flow tube to provide fluid communication between the at least two lower hydraulic openings and the valve member.

7. A method of forming a mud pulse telemetry valve, comprising:
   obtaining a flow tube having a longitudinal axis, an outer surface, and an inner surface, the inner surface defining a bore extending along the longitudinal axis and having a first diameter, the flow tube having at least one upper hydraulic opening extending from the inner surface and at least one lower hydraulic opening extending from the inner surface;
   positioning a flow restriction member in the bore to define an orifice having a second diameter less than the first diameter, the orifice having an upstream side and a downstream side;
   connecting an orifice housing to the flow tube to support the flow restriction member, the orifice housing having at least one inlet port in fluid communication with the upper hydraulic opening upstream of the flow restriction member;
   inserting a screen into the orifice housing, the screen having a first end, a second end, and a sidewall defining a flow path from the first end to the orifice of the flow restriction member, the sidewall having a plurality of filter openings positioned between the flow path and the at least one inlet port;
   positioning a control valve assembly in the bore downstream of the orifice, the control valve assembly having a valve member axially moveable along the second longitudinal axis between an open position and a closed position to control a flow area between the valve member and the flow restriction member; and positioning a pilot valve assembly operable between an open state and a closed state in the bore between the at least one lower hydraulic opening and the valve member.

8. The method of claim 7, further comprising slidably inserting the screen into the orifice housing.

9. The method of claim 8, further comprising engaging a retaining ring with the orifice housing and the screen to retain the screen in the orifice housing.

10. The method of claim 7, further comprising interposing a hanger ring between the at least one lower hydraulic opening and the control valve assembly, the hanger ring having at least one port aligned with the at least one lower hydraulic opening of the flow tube to provide fluid communication between the at least one lower hydraulic opening and the valve member.

11. The method of claim 7, further comprising interposing a hanger ring between the at least two lower hydraulic openings and the control valve assembly, the hanger ring having at least two ports aligned with the at least two lower hydraulic openings of the flow tube to provide fluid communication between the at least two lower hydraulic openings and the valve member.

* * * * *